(12) United States Patent
Jogadhenu

(10) Patent No.: US 12,212,641 B2
(45) Date of Patent: *Jan. 28, 2025

(54) SOFTWARE UPGRADE IN A HOME NETWORK USING LOWER LAYER MESSAGING

(71) Applicant: Entropic Communications, LLC, New York, NY (US)

(72) Inventor: Sagar Jogadhenu, San Diego, CA (US)

(73) Assignee: Entropic Communications, LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/110,117

(22) Filed: Feb. 15, 2023

(65) Prior Publication Data

US 2023/0208947 A1 Jun. 29, 2023

Related U.S. Application Data

(63) Continuation of application No. 16/926,067, filed on Jul. 10, 2020, now Pat. No. 11,601,535, which is a continuation of application No. 16/371,842, filed on Apr. 1, 2019, now abandoned, which is a continuation of application No. 15/632,677, filed on Jun. 26, 2017, now Pat. No. 10,250,724, which is a continuation of (Continued)

(51) Int. Cl.
*G06F 8/70* (2018.01)
*H04L 12/28* (2006.01)
*H04L 12/46* (2006.01)
*H04L 41/082* (2022.01)
*H04L 67/00* (2022.01)
*H04L 69/324* (2022.01)

(52) U.S. Cl.
CPC ........ *H04L 69/324* (2013.01); *H04L 12/2801* (2013.01); *H04L 12/46* (2013.01); *H04L 41/082* (2013.01); *H04L 67/34* (2013.01); *Y02D 30/00* (2018.01)

(58) Field of Classification Search
None
See application file for complete search history.

(56) References Cited

U.S. PATENT DOCUMENTS 7,237,261 B1 * 6/2007 Huber .................. H04W 12/03
726/12
8,519,830 B2  8/2013 Julio
(Continued)

OTHER PUBLICATIONS

Extended European Search Report Appln No. 13777931.0 dated Mar. 22, 2016.

*Primary Examiner* — Scott M Sciacca
(74) *Attorney, Agent, or Firm* — Arch & Lake LLP

(57) ABSTRACT

Principles, apparatuses, systems, circuits, methods, and computer program products for performing a software upgrade in a MoCA network includes receiving an image of a software upgrade at a server and sending the image in the MoCA network using an L2ME message channel to a client that is enabled to receive the image and store the image in a client memory. The image may be broken up into packets, and a sequence number may be assigned to each packet to assist the client in assembling them. CRC information may also be appended to the packets to enable the client to verify their contents.

18 Claims, 5 Drawing Sheets

Related U.S. Application Data application No. 14/933,821, filed on Nov. 5, 2015, now Pat. No. 9,692,859, which is a continuation of application No. 13/448,639, filed on Apr. 17, 2012, now Pat. No. 9,191,461.

(60) Provisional application No. 61/601,197, filed on Feb. 21, 2012.

(56) References Cited

U.S. PATENT DOCUMENTS

| | | |
|---|---|---|
| 9,191,461 B2 | 11/2015 | Jogadhenu |
| 9,692,859 B2 | 6/2017 | Jogadhenu |
| 10,250,724 B2 | 4/2019 | Jogadhenu |
| 2002/0012347 A1 | 1/2002 | Fitzpatrick |
| 2003/0149970 A1 | 8/2003 | Shanbhogue |
| 2003/0217358 A1 | 11/2003 | Thurston et al. |
| 2006/0230395 A1 | 10/2006 | Paul et al. |
| 2007/0096874 A1 | 5/2007 | Mravca |
| 2007/0115962 A1 | 5/2007 | Mammoliti |
| 2007/0127519 A1 | 6/2007 | Hasek |
| 2007/0153809 A1* | 7/2007 | Chang ............... H04L 61/5092 370/395.53 |
| 2007/0299940 A1 | 12/2007 | Gbadegesin et al. |
| 2008/0098212 A1 | 4/2008 | Helms |
| 2008/0134165 A1* | 6/2008 | Anderson .......... H04N 21/4586 717/173 |
| 2008/0189431 A1 | 8/2008 | Hyslop |
| 2008/0209004 A1 | 8/2008 | Hare et al. |
| 2008/0212591 A1 | 9/2008 | Wu et al. |
| 2008/0279219 A1 | 11/2008 | Wu et al. |
| 2009/0083824 A1 | 3/2009 | McCarthy |
| 2009/0235244 A1 | 9/2009 | Enomori |
| 2009/0249320 A1 | 10/2009 | Su |
| 2010/0185731 A1 | 7/2010 | Wu |
| 2010/0185759 A1* | 7/2010 | Wu ..................... H04N 21/643 370/254 |
| 2010/0241838 A1* | 9/2010 | Cohen ................. G06F 11/1004 714/E11.131 |
| 2010/0322134 A1 | 12/2010 | Wu |
| 2011/0078288 A1 | 3/2011 | Chen |
| 2011/0099597 A1 | 4/2011 | Boatright |
| 2011/0167466 A1 | 7/2011 | Aiouaz |
| 2011/0197243 A1 | 8/2011 | Kuo |
| 2011/0255452 A1 | 10/2011 | Brooks |
| 2012/0099436 A1 | 4/2012 | Afzal |
| 2012/0198435 A1 | 8/2012 | Dirstine et al. |
| 2013/0046849 A1* | 2/2013 | Wolf .................... H04L 67/568 709/217 |
| 2013/0125107 A1 | 5/2013 | Bandakka et al. |
| 2013/0215900 A1 | 8/2013 | Jogadhenu |
| 2016/0057258 A1 | 2/2016 | Jogadhenu |

* cited by examiner

SOFTWARE UPGRADE IN A HOME NETWORK USING LOWER LAYER MESSAGING

CROSS-REFERENCES TO RELATED APPLICATIONS

This application is a continuation of U.S. patent application Ser. No. 16/926,067, filed Jul. 10, 2020, which is a continuation of U.S. patent application Ser. No. 16/371,842, filed Apr. 1, 2019, now abandoned, which is a continuation of U.S. patent application Ser. No. 15/632,677, filed Jun. 26, 2017, now U.S. Pat. No. 10,250,724; which is a continuation of U.S. patent application Ser. No. 14/933,821, filed Nov. 11, 2015, now U.S. Pat. No. 9,692,859; which is a continuation of U.S. patent application Ser. No. 13/448,639, filed Apr. 17, 2012, now U.S. Pat. No. 9,191,461; which makes reference to, claims priority to, and claims benefit from U.S. Provisional Patent Application Ser. No. 61/601,197, filed on Feb. 21, 2012, the entire contents of each of which are hereby incorporated herein by reference.

FIELD

The principles, apparatuses, methods, systems, and computer program products relate generally MoCA networks, and especially to principles, apparatuses, methods, systems, and computer program products for performing software upgrades in MoCA networks using Layer-2 Management Entity (L2ME) messaging.

BACKGROUND

As an ever-increasing number of multimedia applications become available, networks, especially home entertainment networks, must be able to accommodate the applications with little or no interruption. Consumers expect to be able to watch digitally recorded video (DVR), TV shows, access video on demand (VOD) services, stream music from their personal computers, play interactive games on the Internet, and more. The consumers expect to enjoy these services in real time, virtually from any room in the home.

A box diagram of a typical home installation of a single-cable system is shown in FIG. 1 as an illustrative example of a home network environment 10 that is based on a MoCA architecture. MoCA® is a service mark of Multimedia Over Coax Alliance, Inc. of San Ramon, California. The Multimedia Over Coax Alliance is a trade group that promotes standards relating to software protocols, hardware topologies, interconnections of consumer electronics devices, and networking thereof. As the MoCA standards develop, various names have emerged to describe the software protocols, hardware topologies, interconnections, and networks that adhere to particular MoCA standards versions, such as "MoCA 1.1," "MoCA 2.0," and so forth. Thus, unless otherwise specifically noted, the term "MoCA" is used herein to designate software protocols, hardware topologies, interconnections of consumer electronics devices, and networks that substantially meet a past, present, or future MoCA standard for the purpose or purposes stated or implied herein.

MoCA networks are typically fully meshed networks and operate at layer-2 (the Media Access Control (MAC) layer) of the seven-layer Open System Interconnect (OSI) reference model of computer networking. Layer-2 corresponds to, or is part of, the link layer of the TCP/IP reference model. MoCA bridges are layer-2 bridging devices that bridge between a MoCA network and another networking interface, such as Ethernet, 802.11a/b/g/n, Universal Serial Bus (USB), Very-high-bit-rate Digital Subscriber Line (VDSL), Gigabyte Passive Optical Network (GPON), etc. MoCA bridges are referred herein to as L2 devices, and, among other things, enable legacy devices to be connected to the MoCA network.

The home network environment 10 is an illustrative example of one of many such environments to which the disclosed methods, apparatuses, systems, and computer program products pertain. It should be noted that although a home network environment 10 is shown for illustration, the methods, apparatuses, systems, and computer program products described herein may be employed in a myriad of other installation locations. One example may include an apartment complex in which a number of dwellings in multi building complex may be included in a single network. Another example may include a business building in which a network may be employed in a number of offices. Other examples are manifold.

The example home network environment 10 includes a gateway 12, which receives media signals, for example, from a cable or satellite feed on line 14. The gateway 12 directs signals to the layer-2 (L2) MoCA devices in a MoCA network 15 on lines 16, 18, and 20. In the example illustrated, the MoCA devices include a multiroom DVR 22, a first link-layer bridge (L2 bridge) 24 and a second link-layer bridge (L2 bridge) 26. The gateway 12 and the multiroom DVR 22 includes their own built-in L2 bridges (not shown).

In addition, each of the L2 devices in the MoCA network 15 has a MoCA pathway to each of the other L2 devices in the network. Thus, for example, the multiroom DVR 22 is connected to the L2 bridge 24 by a MoCA pathway 28, to the L2 bridge 26 by a MoCA pathway 30, and, as mentioned, to the gateway 12 by a MoCA path 26. The L2 bridge 24 is connected to the L2 bridge 26 by a MoCA pathway 32, and as mentioned to the multiroom DVR 22 by a MoCA pathway 28, and to the gateway 12 by a MoCA pathway 18. Finally, the L2 bridge 26 is connected to the gateway 12, multiroom DVR 22 and L2 bridge 24 by the aforementioned MoCA pathways 20, 30, and 32, respectively. The MoCA pathways may be provided by coaxial cables, fiber optic lines, or the like.

Each of the L2 bridges may be connected to one or more media devices for selectively directing user media thereto. For example, in the example illustrated, the multiroom DVR is connected to a first television (TV) 34. The L2 bridge 24 is connected to a second television (TV2) 36. And the L2 bridge 26 is connected to a personal computer (PC) 38. Although televisions and a PC are illustrated, the L2 bridges can be connected to a myriad of other consumer devices in the MoCA network. Examples of such consumer devices include, but are not limited to, cable, networked, and terrestrial set top boxes (STBs), interactive digital television (IDTV) devices, high definition television (HDTV) devices, digital-cable-ready TVs, multi-tuner digital video recorders, such as digital video recorders (DVRs), personal video recorders (PVRs), or the like, personal computers (PCs), personal computer televisions (PCTVs), media gateways, on-line gaming devices, over-the-top video devices, "Blu-ray BD-live" devices, PC to TV sharing devices, Wi-Fi extenders, TV streaming media devices, such as "Slingbox" devices, "Roku" devices, and the like, and sound devices, such as "SoundBridge" devices, radios, or the like.

Typically, the L2 bridges 24 and 26, the multiroom DVR 22, and gateway 12 are supplied by the service provider and controlled by the service provider via control signals downloaded, for instance, from a cable or satellite link, for instance on line 14. Control here includes management operations such as network configuration, software upgrades of the open network elements, Parameterized Quality of Service (PQoS), PQoS flow setup and tear down, and the like. The software of the closed network elements, however, heretofore could not be upgraded.

The L2 bridges are interconnected with each other in a closed network, indicated by the heavy interconnection lines 16, 18, 20, 28, 30, and 32. Presently, the closed network is not modifiable by the user. The closed network is in distinction to the open network, which is user modifiable and which comprises the interconnections of the consumer devices above described. Consequently, the L2 bridges 24 and 26, the multiroom DVR 22, and gateway 12 can communicate with each other. Because the L2 bridges 24 and 26, the multiroom DVR 22, and gateway 12 are associated with one or more of the consumer devices, the closed network enables the consumer devices to communicate with each other according to the MoCA architecture created thereby. In current networks, the L2 bridges 24 and 26, the multiroom DVR 22, and gateway 12 belong exclusively to the closed network; however, they can be used to extend the open network. In the future, the distinction between open and closed networks may not be so rigid, or may be eliminated entirely.

The aforementioned method and apparatus relies on Layer-2 Management Entity (L2ME) messages defined in the MoCA 1.1 specification. The MoCA 1.1 specification describes L2ME as a robust layer-2 messaging mechanism. L2ME is used for Parameterized Quality of Service (PQoS) and other critical features to coordinate actions between two or more nodes in the network. L2ME also defines the ability for vendors to implement proprietary vendor specific messages, as long as these messages follow L2ME protocol rules. A number of proprietary L2ME messages are defined to facilitate known capabilities, such as device management to obscure capabilities such as an ability for higher layer software between the two devices to communicate using a MoCA network using a robust communication mechanism.

Therefore, one of the key challenges for operators has been to manage the layer-2 devices that do not support higher layers of protocol. Thus, in either scenario, since the layer-2 devices in the closed system are not a part of an Ethernet service or a TCP/IP telnet service to the service provider, the service provider has been unable to provide management functions such as configuration management, status and statistics monitoring, as well as software upgrades.

What is needed therefore are principles, apparatuses, methods, systems, and computer program products that can be used to enable management functions such as configuration management, status and statistics monitoring, as well as software upgrades (referred to collectively herein as "software upgrades") in MoCA systems, including such MoCA systems deployed in a MoCA home network environments.

SUMMARY

The following presents a simplified summary of one or more embodiments in order to provide a basic understanding of some aspects of such embodiments. This summary is not an extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description that is presented later.

One embodiment of the presently disclosed method and apparatus manages layer-2 bridges (L2 bridges) from the gateway (or any other higher layer device that an operator desires to use). Another embodiment provides for the use of L2ME messages to facilitate software upgrade of L2 bridges from the gateway device (or any other higher layer device that an operator desires to use).

Operators can initiate software upgrade remotely from the gateway (or an equivalent node) also known as the "server". The devices that are upgraded are considered "clients." The word "server" is used herein to identify nodes that are initiating a SW (software) upgrade, and the word "client" is used to identify the nodes that are being upgraded. The servers receive the image to be upgraded via the cable or satellite operators directly.

In some networks, different clients may be operating with different software versions. A device discovery mechanism, such as LLDP (Link Layer Discovery Protocol) may be used to identify the hardware and software version information being used to ensure that the servers use an appropriate image to upgrade different clients. Examples of mechanisms of device discovery are described in copending patent application Ser. No. 13/343,904 filed Jan. 5, 2012, and assigned to the assignee hereof.

According to one embodiment, a method of performing a software upgrade in a MoCA network includes receiving an image of a software upgrade at a server and sending the image in the MoCA network using an L2ME message channel to a client that is enabled to receive the image and store the image in a client memory. The image may be broken up into packets, and a sequence number may be assigned to each packet to assist the client in assembling them. CRC information may also be appended to the packets to enable the client to verify their contents.

According to another embodiment, a method of performing a software upgrade of a client in a MoCA network includes receiving an image of a software update on an L2ME message channel in the MoCA network and storing the image in a client memory. The image may be broken up into packets, and a sequence number may be assigned to each packet to assist the client in assembling them. CRC information may also be appended to the packets to enable the client to verify their contents.

According to another embodiment a MoCA network includes a server, a client, and an L2ME message channel. The server is configured to receive an image of a software upgrade, to break the image into packets, and to send the packets to a client over the L2ME message channel. The client is configured to receive the packets and to store at least a portion of the packets in a client memory. The server may also be configured to assign a sequence number to each packet before sending the packets to the client. The server may also be configured to append CRC information to the packets before sending the packets to the client to enable the client to verify the content of the received packets.

According to another embodiment, a MoCA network server includes a receiver to receive a software update image and a transmitter to send the packetized software update image to a client via an L2ME message channel. The MoCA network server may also include means for packetizing the software update image and assigning a sequence number to each packet of the packetized software update image. the MoCA server may also include means for appending CRC information to the packets. The MoCA network server may also include a software application for controlling the receiver, the transmitter, the means for packetizing, the means for assigning a sequence number, and the means for appending CRC information.

According to yet another embodiment, a MoCA network client includes a receiver to receive a software update image on an L2ME message channel and means for storing the software update image in a client memory. The MoCA network client may also include means for receiving packets containing the software update image and an assembler to assemble the packets into the software update image using assigned sequence numbers. The MoCA network client may also include logic to verify a content of the received packets using CRC information appended to the packets. The MoCA network client may also include a software application for controlling the receiver, the means for storing, the assembler, and the logic to verify a content of the received packets.

According to still another embodiment, a home entertainment system includes a server, a client, and an L2ME message channel in a MoCA network. The server is configured to receive an image of a software upgrade, to break the image into packets, and to send the packets to a client over the L2ME message channel. The client is configured to receive the packets and to store at least a portion of the packets in a client memory. The server may also be configured to assign a sequence number to each packet before sending the packets to the client and the client may also be configured to receive and assemble the packets into the image using the assigned sequence number. The server may also be configured to append CRC information to the packets before sending the packets to the client, and the client may be configured to verify the content of the received packets using the CRC information.

According to still yet another embodiment, a computer program product includes at least one computer usable medium having a computer readable program code embodied therein. The computer readable program code is adapted to be executed to implement a method for upgrading software of a client processor in a MoCA network. The method includes receiving an image of a software upgrade at a server, breaking up the image into packets, and sending the packets to a client in the MoCA network using at least one L2ME message. The client is enabled to receive the packets and store the image in a client memory. The computer program product may also perform assigning a sequence number to each packet before sending the packets to the client to enable the client to receive and assemble the packets into the image using the assigned sequence number. The computer program product may also perform appending CRC information to the packets before sending the packets to the client, to enable the client to verify the content of the received packets. The computer program product may be configured with one portion of the at least one computer usable medium is located in the server and another portion of the at least one computer usable medium is located in the client.

BRIEF DESCRIPTION OF THE DRAWINGS

One or more various embodiments of the disclosed principles, apparatuses, methods, systems, and computer program products are described with reference to the following figures. The drawings are provided for purposes of illustration only and merely depict examples of some disclosed embodiments to facilitate the reader's understanding. They should not be considered to limit the breadth, scope, or applicability of the claimed invention. It should be noted that for clarity and ease of illustration these drawings are not necessarily made to scale. The figures are not intended to be exhaustive or to limit the claimed invention to the precise form disclosed. It should be understood that the disclosed principles, apparatuses, methods, systems, and computer program products can be practiced with modification and alteration, and that the invention should be limited only by the claims and the equivalents thereof.

In the various figures of the drawing, like reference numerals denote like or similar parts.

DETAILED DESCRIPTION

Figure 1:
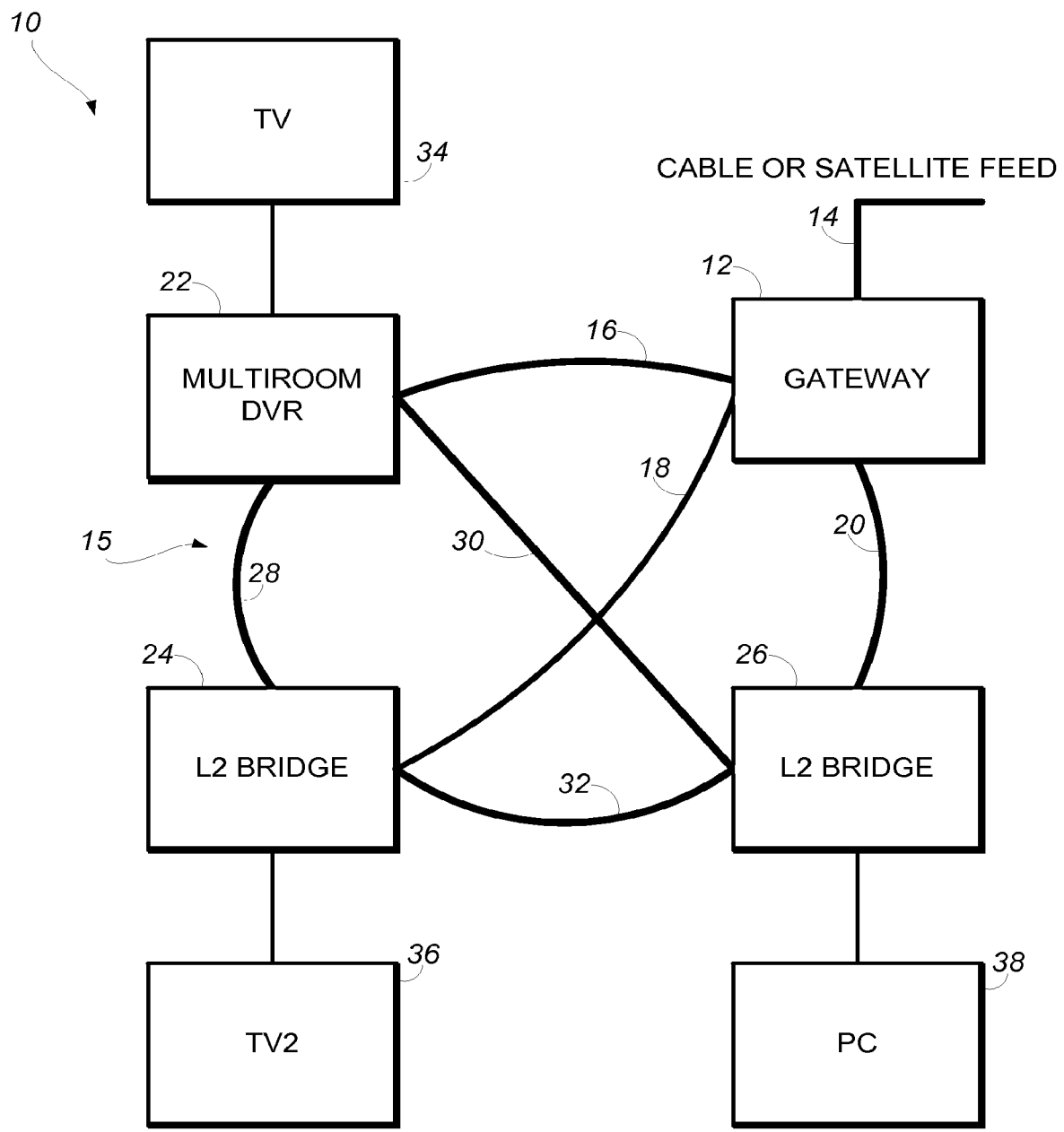
FIG. 1 shows an example MoCA network used in a home media network.
Figure 2:
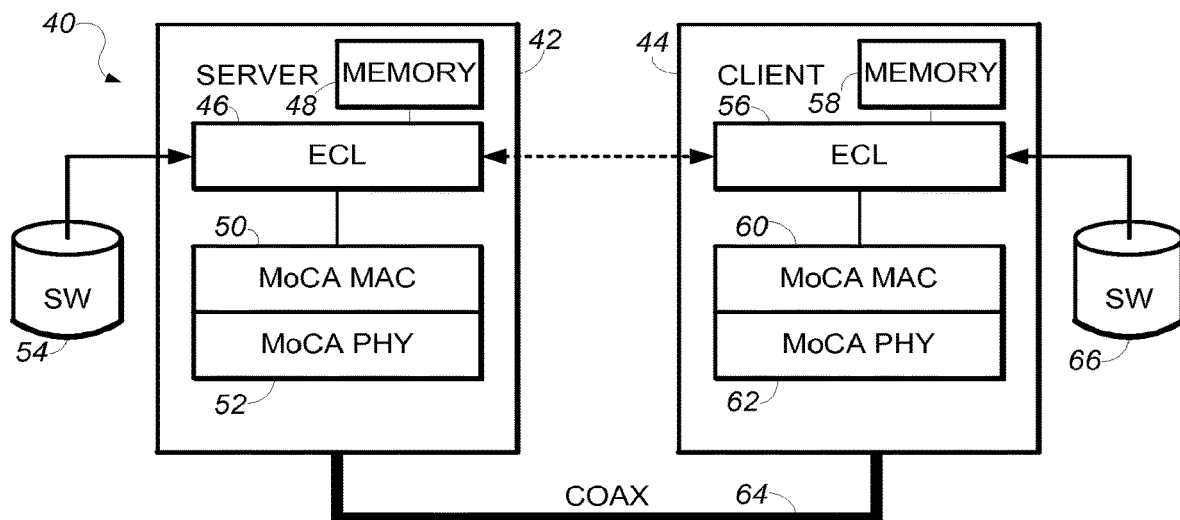
FIG. 2 shows a block diagram illustrating an example of a software upgrade hardware configuration using a MoCA interface.

The disclosed are principles, apparatuses, methods, systems, and computer program products perform a software upgrade using a MoCA interface. A block diagram of one example of a construction for a system 40 to perform the software upgrade using MoCA interface is shown in FIG. 2, to which reference is now additionally made.

The system 40 includes a server 42 and at least one client 44. The server 42 includes an ECL (Ethernet Convergence Layer) 46, a memory 48, and hardware and software to provide a MoCA MAC (Media Access Control) layer 50 and a MoCA PHY (physical) layer 52. The ECL is described in the MoCA specification, and is the boundary between the MoCA MAC layer and upper layer software, such as TCP/IP and other applications. The MoCA MAC layer is a sublayer of the data link layer and serves as an interface between the logical link control sublayer and the PHY layer. The PHY layer controls the transmission of data bits between network nodes.

The client 44 is constructed in a manner that is substantially similar to the server 40, including an ECL 56, a memory 58, and hardware and software to provide a MoCA MAC layer 60 and a MoCA PHY layer 62. The server 42 and client 44 are connected, for example, by a coaxial cable 64, or the like, over which an L2ME message can be transmitted. Although only one client 44 is illustrated, it should be understood that a plurality of similarly constructed clients may exist in any particular installation.

In the upgrade process, the ECL 40 receives a software image 54 to be upgraded from a central office (not shown) and stores it in its local memory 46. The central office may be, for example, a media content provider. The server 40 breaks up the software image 54, for example, into multiple small packets of 4-6 words each. (The 4-6 word size is imposed by limitations of the interface between the ECL 46 and the MoCA MAC layer 50 in current devices; however, in future products, this size may be larger, limited by the size of the maximum payload allowed by the L2ME messages of the systems.)

After the software update image has been received and packetized, the ECL 40 of the server 42 assigns a sequence number and appends CRC (Cyclic Redundancy Check) information to each packet to ensure the client can assemble these packets into the software image. The ECL 56 of the server 42 then sends the packets over the coaxial cable 64 to the ECL 56 of the client 44, using the proprietary L2ME messages. The client 44 receives the packets, and, after CRC verification, writes them to a nonvolatile memory 66 to store the software image.

Figure 3:
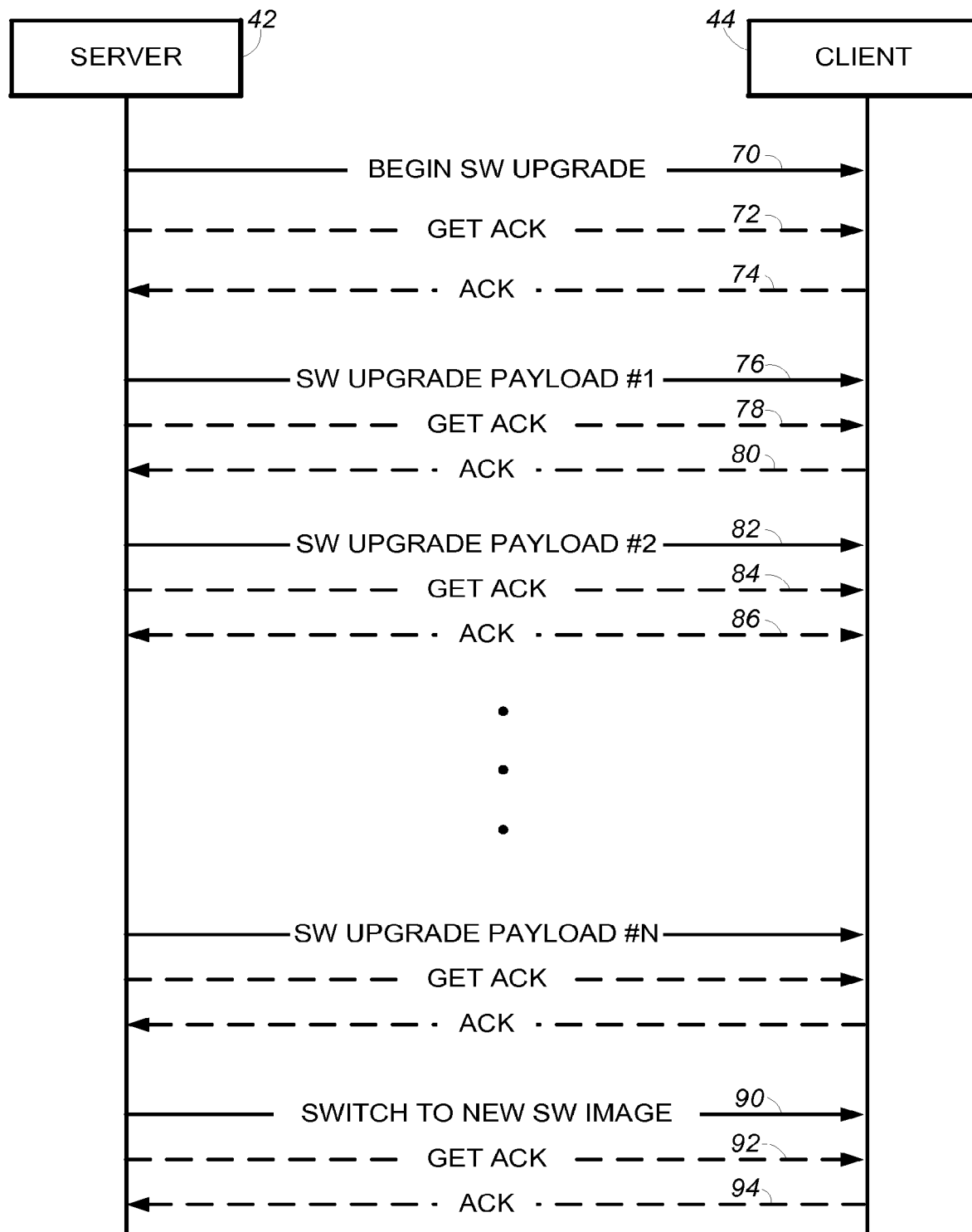
FIG. 3 shows a sequence diagram illustrating an example of a software upgrade process.

FIG. 3 to which reference is now additionally made shows an example sequence diagram for the software upgrade process. For simplicity, the NC (Network Controller), which may be involved in relaying L2ME messages, is not shown. The upgrade process begins by the server 42 sending a message 70 to the client 44 to begin a software upgrade. The server then sends a request acknowledgement message 72 to the client asking for acknowledgment that the client is ready to receive the software upgrade. The client 44 responds with an acknowledgement message 74.

The server then begins the process of sending the software image packets to the client 44, sending software payload #1 76 to the client 44. After software payload #1 has been sent, the server 42 sends a receive acknowledgement message 78 to the client 44 indicating that software payload #1' has been sent, to assure that software payload #1 has been received. The client 44 responds with an acknowledgement message 80. The server 42 then sends software payload #2 82 to the client 44. After software payload #2 has been sent, the server 42 sends a receive acknowledgement message 84 to the client 44 indicating that software payload #2' has been sent, to assure that software payload #2 has been received. The client 44 responds with an acknowledgement message 86. The process is repeated until all of the software image packets have been sent and received.

After the entire software image packets have been sent and received, the server sends a message 90 to the client 44 to switch to the new image. The server 42 then requests acknowledgment 92 from the client 44 that the client 44 has received the message 90. The client 44 responds with an acknowledgement message 94. The client 44 then switches to the new software image.

Figure 4:
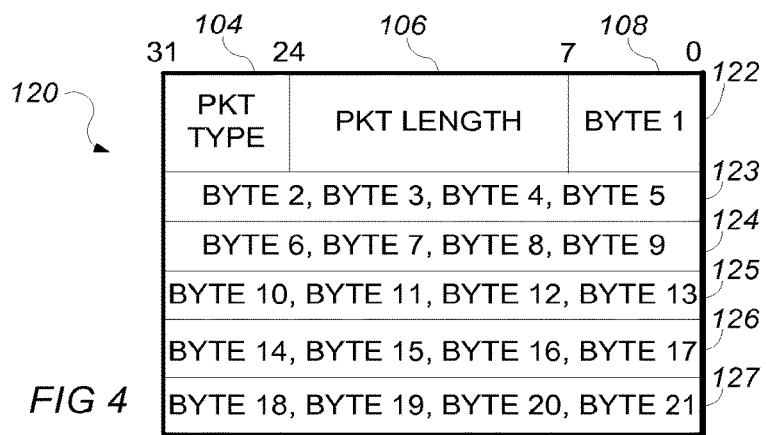
FIG. 4 shows an example of a possible payload construction for each upgrade packet.

FIG. 4, to which reference is now additionally made, shows one possible format 120 by which the L2ME payload of the three message types, "begin SW upgrade," "SW upgrade payload (#N)," and "switch to new SW image," shown in FIG. 3 may be constructed. The first set of information contains packet type information 104 in the first byte of the first word 122. The second set of information contains packet length information 106 in the next two bytes of the first word 122. And the third set of information contains the first byte, BYTE 1, 108 of the payload in the last byte 108 of the first word 122. The remaining words 123-127 each contain four bytes of the software update image.

The packet type information 104 specifies the type of information of the packet type parameter, can be anything agreed to between the server and client, for example:

```
#define UPGRADE_PKT 1
#define START_UPGRADE_PKT 2
#define SWITCH_TO_NEW_IMAGE 3
```

The packet length information 106 is zero if the packet type information 104 is START_UPGRADE_PKT or SWITCH_TO_NEW_IMAGE. However, the packet length information 106 is non-zero if the packet type information 104 is UPGRADE_PKT. The packet length information 106 is the number of bytes of the upgrade packet and has a maximum length of 360 bytes. (It should be noted that the current software implementation has a 21-byte limitation with respect to the maximum number of upgrade packet bytes; however, future implementations will be able to support the maximum possible payload size of 360 bytes allowed by L2ME transactions.)

Figure 5:
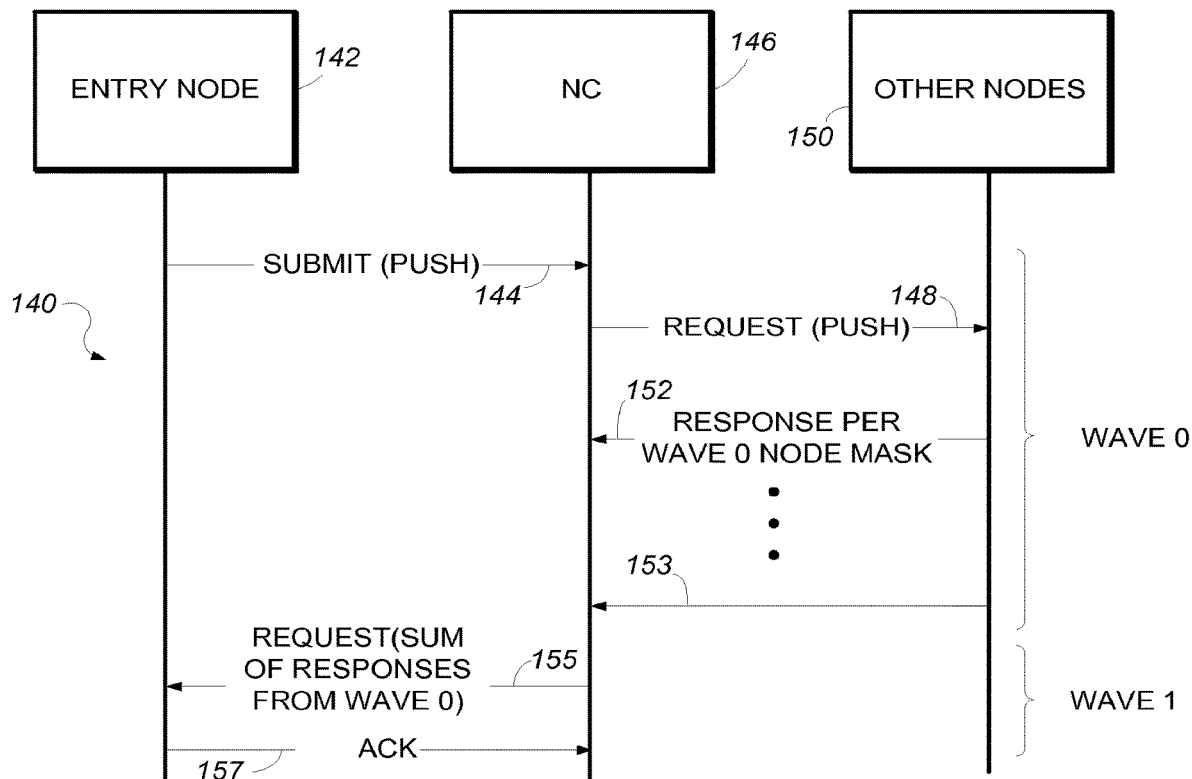
FIG. 5 is a sequence diagram illustrating an example of a two-wave push message L2ME transaction.

Examples of vendor specific L2ME messages that can be used to support the above-described software upgrade process include a "push message" L2ME transaction and a "get push message acknowledgement" L2ME transaction. An example of the "push message" L2ME transaction 140 is illustrated in the sequence diagram of FIG. 5, to which reference is now additionally made. The process begins in a first wave, wave 0, by an entry node 142 pushing a "submit" message to the network controller 146. The entry node 142 is the server performing the software upgrade. The network controller 146 does not interpret the contents of the submit message 144, unless the network controller 146, itself, is part of the node bit mask requested by entry node 142.

The network controller 146, in turn, pushes a request message 148 to the other nodes in the MoCA network, collectively indicated by the reference numeral 150. The network controller 146 creates the wave 0 request message 148 based on the submit message 144 received from the entry node server 142. The network controller copies the information from the submit message 144 into the request message 148 appropriately, including both the L2ME header and the payload information.

In response to the request from the network controller 146, the other nodes 150 send responses 152 . . . 153 back to the network controller 146 in accordance with the wave 0 node mask. The wave 0 response from the nodes 150 does not contain any payload. The nodes that understand the wave 0 request will set an INTERPRETED bit to "1" in the RESP_STATUS field of the response message.

The network controller 146 then passes a concatenated response 155 from all the client nodes 150 from wave 0 back to the entry node 142 in a second wave, denoted wave 1, and the entry node 142 acknowledges the request with an acknowledge message 157 to close the transaction. Since there is no payload in the wave 1 request, the request primarily contains a list of all nodes that reported with the INTERPRETED bit set. It should be noted that the entry node MoCA MAC layer can communicate the response to ECL software that is responsible for the software upgrade process.

An example of the basic format submit message 144 follows the submit message format specified in the MoCA 1.1 specification table 2.2. Following are specific values to be filled in SUBMIT message for PUSH transaction:

VENDOR_ID=0x10 (Vendor ID)
TRANS_TYPE=1 (Network Management type)
TRANS_SUBTYPE=3 (PUSH transaction)
WAVE0_NODEMASK=bit mask indicating all client node IDs that need to receive this PUSH message
MSG_PRIORITY=64
TXN_LAST_WAVE_NUM=1

The push message can also be used for other purposes such as node discovery. For example, a client node can initiate a push message. An examples of a possible push message includes:
define PUSH_NODE_INFO 4

The payload for this case may be:
Vendor ID—byte 1 & byte 2
Hardware version ID—byte 2, byte 3, byte 4 and byte 5

Chip ID—byte 6, byte 7, byte 8 and byte 9

Software version ID—byte 10, byte 11, byte 12 and byte 13

MAC Address—byte 14, byte 15, byte 16, byte 17, byte 18 and byte 19

The packet length of the push message of this example would be set to 19 in this case.

Figure 6:
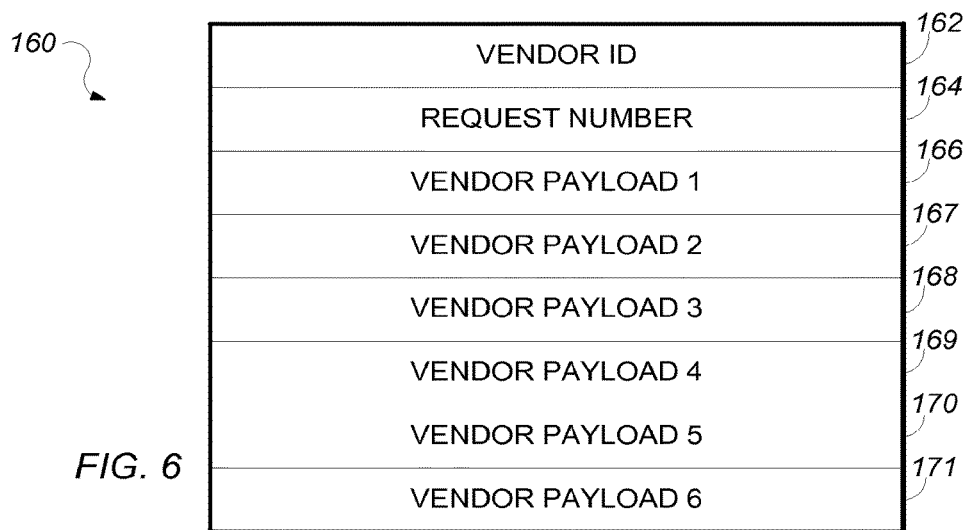
FIG. 6 shows an example of an L2ME payload for the PUSH message example illustrated in FIG. 5.

An example of the L2ME message payload 160 for the push message 144 is shown in FIG. 6, to which reference is now additionally made. The push message 160 includes a vendor identification 162, a request number 164, and a number of vender payload words 166-177. The vendor identification may be an OEM's/Service Provider's vendor ID of an OEM or service provider and may or may not be same as the VENDOR_ID in the L2ME message SUBMIT header. The vendor identification should not exceed a 16-bit value. The request number 164 can be used as a transaction identification and can be used to verify that the clients correctly received the request. The request number range is 0-255. The request number should not be used as a software upgrade packet sequence number due to limitation on value range. The last six words 166-171 are for vendor specific information. Each word is 32 bits wide. For software upgrade purposes, this can contain one of the packet formats described above with reference to FIG. 4.

It should be noted that L2ME procedure ensures reliable delivery of the software upgrade payload to the MoCA MAC layer running on the client nodes. The ECL of the server has to periodically poll and retrieve the payload from the MoCA MAC layer on the client nodes. The ECL on the server can retrieve the entire L2ME payload of the push message 144. A software development kit (SDK) is available to provide APIs to allow this retrieval Entropic Communications, Inc. of San Diego, California Thus, the acknowledgements received from client nodes 150 as part of the L2ME transactions are not sufficient for the server to ensure that the ECL on the client nodes received the vendor payload. To confirm that the ECL has received the payload, another L2ME transaction called "get push acknowledgement" may be employed. That transaction gets acknowledgement from the ECL that the payload has been received. In a "get push acknowledgement" transaction, the client nodes 150 will return the "request number" received in the push transaction as a part of a push acknowledgement L2ME transaction (described below).

It is optional for the server to initiate a push acknowledgement transaction following a push transaction. A push acknowledgement transaction ensures an end-to-end (i.e., server-client) acknowledgement. If the push acknowledgement transaction is not initiated, the server must ensure a sufficient time gap between successive push transactions (i.e., successive upgrade packets) to ensure that the previous packet is not overwritten before the ECL on the client retrieved it. The actual time gap is implementation dependent and has to be determined by the amount of time it takes complete one push L2ME transaction plus the periodicity of polling by the client.

If the server decides to initiate a push acknowledgement transaction, it is possible sometimes the push acknowledgement returns with a failure (for example, if the ECL at the client has not retrieved the upgrade packet yet). In such cases, the server has to retry the push acknowledgement. Another possibility is to introduce a delay between push and push acknowledgement.

Figure 7:
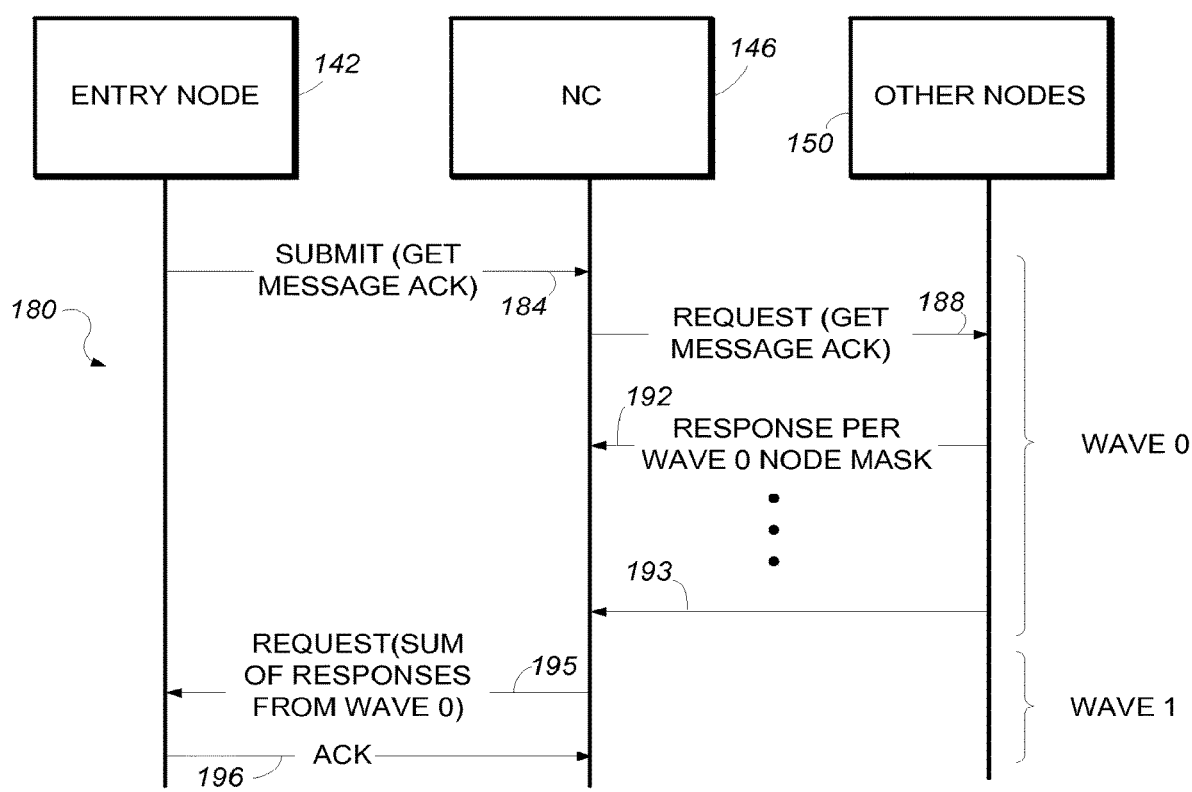
FIG. 7 is a sequence diagram illustrating an example of a two-wave get push message acknowledgement L2ME transaction.

As mentioned above, the entry node 150 server may initiate a get push message acknowledgement L2ME transaction to confirm that the ECLs at all the clients in the other nodes 150 have successfully received the payload from a previously sent push message. Alternatively, a user may initiate a push acknowledgement L2ME transaction. In either event, the get push message acknowledgement L2ME transaction or the push acknowledgement L2ME transaction are optional messages and that improve the robustness of a transaction end-to-end. However, these messages may also add extra messages on the wire and potentially extra time to the software upgrade process. An example of a sequence diagram of the get push message acknowledgement L2ME transaction 180 is illustrated in FIG. 7, to which reference is now additionally made. Those skilled in the art will recognize that the sequences of a push acknowledgement L2ME transaction that is initiated by a user will be substantially similar to those shown in the example of the server initiated get push message acknowledgement L2ME transaction.

The process begins in a first wave, wave 0, by an entry node 142 pushing a wave 0 submit "get message acknowledgement" message 184 to the network controller 146. The L2ME header for the submit get push message acknowledgement L2ME message is similar to the push message described above with reference to FIG. 6, except the transaction subtype is TRANS_SUBTYPE=2 (GET PUSH ACK) and the payload is a 32 bit field containing the request number. The value contained in the request number has to be identical to the value sent in the push message.

The network controller 146 does not interpret the contents of the submit message 184, unless the network controller 146, itself, is part of the node bit mask requested by entry node 142. After the network controller 146 has received the submit message 184, it copies the information from the submit message 184 into a request message 188, including both the L2ME header and the payload information. The network controller then broadcasts, or pushes, the request message 188 to the other nodes 150 in the MoCA network.

In response to the request from the network controller 146, the other nodes 150 send responses 192 . . . 193 back to the network controller 146 in accordance with the wave 0 node mask. The nodes that understand the wave 0 request will respond with the INTERPRETED bit to set to "1."

The response also contains a payload of 32 bits comprising the ECL acknowledgement status as follows:

Value of "1" indicates ECL successfully acknowledged;

Value of "0" indicates ECL has not acknowledged.

The network controller 146 then passes a concatenated response 195 from all the client nodes 150 from wave 0 back to the entry node 142 in a second wave, denoted wave 1, and the entry node 142 acknowledges the request with an acknowledge message 196 to close the transaction. There is no payload in the wave 1 request, hence the request primarily contains list of all nodes that reported with INTERPRETED bit set. It should be noted that the entry node MoCA MAC layer can communicate the response to ECL software that is responsible for the software upgrade process.

It should be apparent from the above that the methods and techniques described above for upgrading software of a client processor in a MoCA network can be accomplished in software, contained for example in at least one computer program product, such as a memory, or other computer usable medium having a computer readable program code embodied therein. In the examples described above with regard, for example, to FIGS. 2, 3, 5, and 7, instances of the computer usable medium and computer readable program code thereon may be located at any or all of the various locations described. Thus, an instance of the computer usable medium and computer readable program code thereon may be located in one of, or all of, the server, network controller, client(s) entry node, or other MoCA node on or serving the MoCA network.

While various embodiments of the disclosed method and apparatus have been described above, it should be understood that they have been presented by way of example only, and should not limit the claimed invention. Likewise, the various diagrams may depict an example architectural or other configuration for the disclosed method and apparatus. This is done to aid in understanding the features and functionality that can be included in the disclosed method and apparatus. The claimed invention is not restricted to the illustrated example architectures or configurations, rather the desired features can be implemented using a variety of alternative architectures and configurations. Indeed, it will be apparent to one of skill in the art how alternative functional, logical or physical partitioning and configurations can be implemented to implement the desired features of the disclosed method and apparatus. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed method and apparatus is described above in terms of various exemplary embodiments and implementations, it should be understood that the various features, aspects and functionality described in one or more of the individual embodiments are not limited in their applicability to the particular embodiment with which they are described. Thus, the breadth and scope of the claimed invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method of performing a software upgrade in a network, comprising:
    initiating the software upgrade, via a service provider, by pushing a submit message to a gateway, wherein the gateway, indicated by a node bit mask requested by the service provider to receive the submit message, interprets the submit message based on the node bit mask, the node bit mask being configured to indicate the nodes that need to receive the submit message;
    pushing a request message, via the gateway, to a television set top box in the network;
    passing a response message, via the gateway, to the service provider; and
    transmitting an image of a software upgrade, via the gateway, from the service provider to the television set top box,
    wherein the gateway is a Multimedia Over Coax Alliance (MoCA) gateway.

2. The method of claim 1, wherein the network is a Multimedia Over Coax Alliance (MoCA) network.

3. The method of claim 1, wherein the image of the software upgrade is transmitted from the service provider to the gateway over a communication network external to a coaxial cable network of a home.

4. The method of claim 1, wherein the image of the software upgrade is transmitted from the gateway to the television set top box over a coaxial cable network of a home.

5. The method of claim 1, wherein the method comprises instructing the gateway to send the image of the software upgrade as at least one L2ME (Layer-2 Management Entity) message on an L2ME message channel.

6. The method of claim 1, wherein the software upgrade is associated with a message type indication that specifies to the television set top box that the software upgrade is for upgrading software.

7. The method of claim 1, wherein the software upgrade is transmitted in a message comprising a plurality of packets.

8. The method of claim 1, wherein the television set top box assembles a plurality of packets to form the software upgrade.

9. The method of claim 2, wherein the software upgrade is transmitted in a message comprising a CRC (Cyclic Redundancy Check).

10. A service provider server for performing a software upgrade in a network, wherein the service provider server comprises:
  memory operable to store the software upgrade;
  circuitry operable to:
   push a submit message to a gateway, wherein the gateway, indicated by a node bit mask requested by the service provider to receive the submit message, interprets the submit message based on the node bit mask, the node bit mask being configured to indicate the nodes that need to receive the submit message;
   receive a response message from the gateway according to a request message to a television set top box in the network; and
   transmit an image of the software upgrade to the television set top box via an instruction to the gateway,
  wherein the gateway is a Multimedia Over Coax Alliance (MoCA) gateway.

11. The service provider server of claim 10, wherein the network is a Multimedia Over Coax Alliance (MoCA) network.

12. The service provider server of claim 10, wherein the image of the software upgrade is transmitted to the gateway over a communication network external to a coaxial cable network of a home.

13. The service provider server of claim 10, wherein the image of the software upgrade is transmitted from the gateway to the television set top box over a coaxial cable network of a home.

14. The service provider server of claim 10, wherein the instruction to the gateway informs the gateway to send the image of the software upgrade as at least one L2ME (Layer-2 Management Entity) message on an L2ME message channel.

15. The service provider server of claim 10, wherein the software upgrade is associated with a message type indication that specifies to the television set top box that the software upgrade is for upgrading software.

16. The service provider server of claim 10, wherein the software upgrade is transmitted in a message comprising a plurality of packets.

17. The service provider server of claim 10, wherein the television set top box assembles a plurality of packets to form the software upgrade.

18. The service provider server of claim 11, wherein the software upgrade is transmitted in a message comprising a CRC (Cyclic Redundancy Check).

* * * * *